United States Patent

[11] 3,598,121

| [72] | Inventor | Jhon Lelicoff<br>1732 Norfolk Lane, Anaheim, Calif. 92805 |
|---|---|---|
| [21] | Appl. No. | 783,206 |
| [22] | Filed | Dec. 12, 1968<br>Division of Ser. No. 528,491, Feb. 18, 1966,<br>Pat. No. 3,439,674. |
| [45] | Patented | Aug. 10, 1971 |

[54] LIQUID EYEWASH DISPENSING DEVICE INCLUDING EYELID-ENGAGING MEANS
2 Claims, 7 Drawing Figs.

[52] U.S. Cl. .................................................. 128/233, 128/249, 222/174
[51] Int. Cl. ........................................................ A61m 1/00
[50] Field of Search ............................................ 128/233, 249, 248, 173, 272; 222/173, 174, 184, 180, 105

[56] References Cited
UNITED STATES PATENTS

| 2,482,431 | 9/1949 | Okawa | 128/233 |
| 2,898,911 | 8/1959 | Taylor | 128/249 |

FOREIGN PATENTS

| 594,860 | 3/1934 | Germany | 128/233 |
| 722,852 | 3/1932 | France | 128/233 |

Primary Examiner—Richard A. Gaudet
Assistant Examiner—J. Yasko
Attorney—William C. Babcock ABSTRACT: An eyewash liquid dispensing device including a container on which an eyelid-engaging assembly is movably supported in an open position when a liquid is being applied to an eyeball.

PATENTED AUG 10 1971  3,598,121
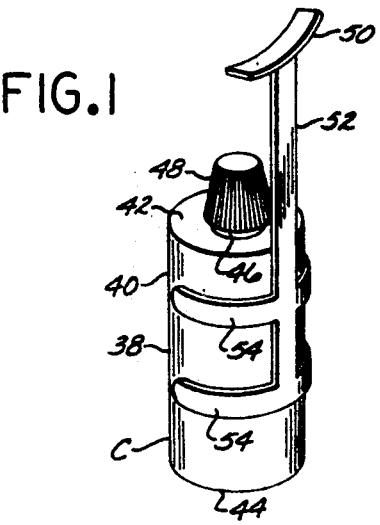
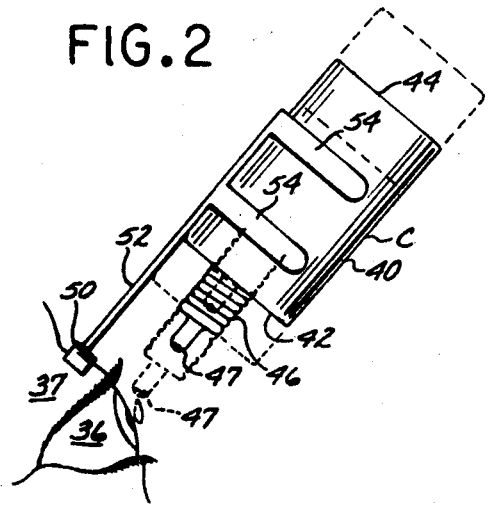
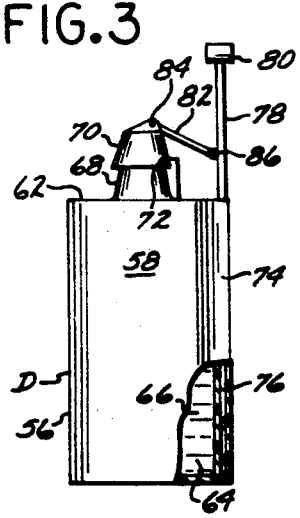
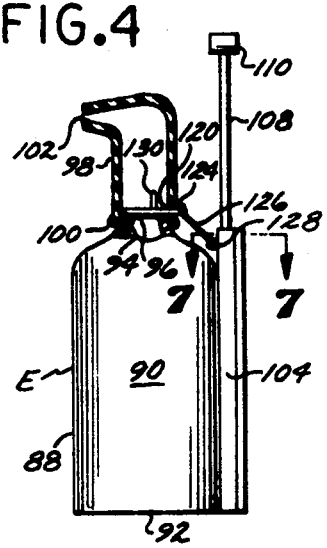
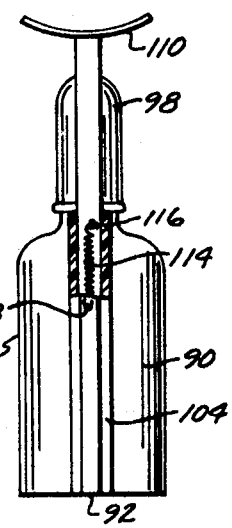
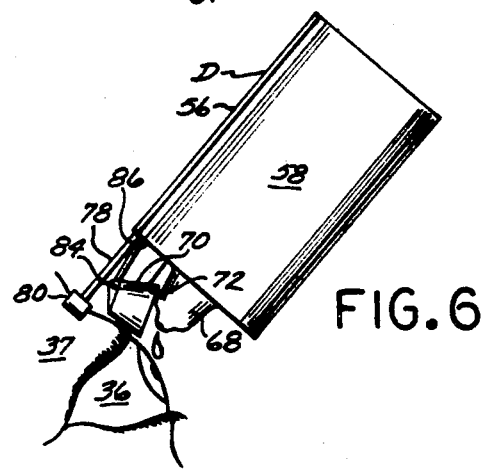
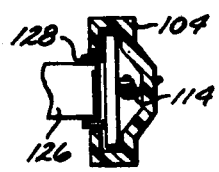
INVENTOR.
JHON LELICOFF
BY William G. Babcock
ATTORNEY

LIQUID EYEWASH DISPENSING DEVICE INCLUDING EYELID-ENGAGING MEANS

CROSS-REFERENCE TO RELATED APPLICATION

The present invention is a division of application Ser. No. 528,491 filed Feb. 18, 1966, now U.S. Pat. No. 3,439,674.

BACKGROUND OF THE INVENTION

1. Field of the Invention

A normally sealed container for dispensing a liquid eyewash that includes eyelid-engaging means as a part thereof.

2. Description of the Prior Art

As is well known, the human eye is extremely sensitive to dust, small foreign objects, and the like, and when such materials come into contact with the eyes, they quickly become irritated. One commonly accepted method of alleviating this condition is to apply a mild liquid medicant to the eyes, frequently referred to as an eyewash, which is normally applied by use of a dropper. However, a particularly annoying problem or difficulty in so applying an eyewash or other liquid medicant to the eyes, is to maintain the eyelids in an open position during application thereof.

The present invention solves the problem just described by providing an eyelid engaging member that is a part of the container in which the eyewash is merchandised, and from which container the liquid medicant is dispensed into the eye.

SUMMARY OF THE INVENTION

An eyewash-dispensing device including a liquid eyewash container in which a discharge aperture is formed that is normally closed by a cap, together with a container which not only holds the medicant, but serves as a support for an eyelid engaging assembly that is longitudinally adjustable relative to the container.

A major object of the present invention is to provide an eyewash liquid dispensing device that more easily serves this function in that it provides means for maintaining the eyelid in an open position during application of eyewash liquid to the eyes.

Another object of the invention is to provide an eyewash dispensing device of compact, simple mechanical structure which can be fabricated from standard, commercially available materials, is inexpensive to produce, and due to the convenience provided thereby in maintaining the eyelids in an open position as a liquid wash or other medicant is applied to the eye, should enjoy widespread acceptance.

BRIEF DESCRIPTION OF THE DRAWING

FIG. 1 is a perspective view of a first form of eyewash dispensing device having longitudinally movable means associated therewith for maintaining the eyelid of a user in an open position during application of the medicant;

FIG. 2 is a side elevational view of said first form of the device illustrating the manner in which the same is used to dispense a liquid medicant onto an eyeball;

FIG. 3 is a side elevational view of a second form of the invention partially broken away to show the interior structure thereof;

FIG. 4 is a combined side elevational and vertical cross-sectional view of a third form of the invention;

FIG. 5 is a second combined side elevational and vertical cross-sectional view of the third form of the invention;

FIG. 6 is a side elevational view of the second form of the invention in an eyewash-dispensing position; and FIG. 7 is a transverse cross-sectional view of the third form of the device, taken on the line 7–7 of FIG. 4.

DESCRIPTION OF THE PREFERRED EMBODIMENTS

A first form C of the eyewash-dispensing device is shown in FIGS. 1 and 2, which includes a container 38 defined by a cylindrical sidewall 40, a top 42, and a bottom 44. A threaded neck 46 projects upwardly from the top 42, which is adapted to be engaged by a cap 48. An aperture 47 is formed in neck 46 through which eyewash may be discharged from container 38 in the manner illustrated in FIG. 2. An arcuate eyelid-engaging member 50 is affixed to the upper end of a rigid strip 52. A number of pairs of arcuate claws 54 (FIG. 3) extend outwardly from strip 52, which slidably and frictionally engage the exterior surface of the sidewall 40. To use the first form C of the invention, the integrally formed rigid strip 52 and eyelid-engaging member 50 are adjusted to a desired position relative to the container 38 (FIG. 2), and the cap 48 removed from the neck 46 whereby liquid medicant may be discharged from the device into an eye 36. The member 50 is in contact with the eyelid 37 during the dispensing operation, and serves to hold the eyelid in an open position. When the first form of the invention C is not in use, the member 50 and strip 52 can be moved downwardly relative to container 38 to provide a compact package for storage purposes.

A second form D of the invention is shown in FIG. 2, which includes a container 56 defined by a continuous sidewall 58 of any desired configuration, a bottom 60 and a top 62 that cooperatively provide a confined space 64 in which an eyewash or other liquid medicant 66 is contained. A tubular neck 68 projects upwardly from top 62, and a cap 70 is pivotally supported on this neck by a pin 72. A vertically extending channel-shaped member 74 is formed as a part of container 56, which member, together with the sidewall 58, cooperatively define a vertically extending space 76.

A rigid strip 78 is slidably disposed in space 76, with the upper end of this strip (FIG. 2) supporting an arcuate eyelid-engaging member 80 of the same structure as that of member 30. A link 82 is connected by a first pin 84 to cap 70, and by a second pin 86 to the rigid strip 78. When the strip 78 is moved downwardly in space 76, the link 82 pivots the cap 70 into an open position to permit discharge of liquid 66 through the neck 68 onto the eyeball 36, as shown in FIG. 6.

A third form E of the dispenser is shown in FIGS. 4, 5, and 7, which includes a container 88, preferably defined by a cylindrical sidewall 90 having a bottom 92, the top of which sidewall terminates in a short tubular neck 94. A circumferentially extending recess 96 is formed on the exterior of the neck 94. A tubular liquid dispenser 98 is provided that is formed from a resilient polymerized resin such as polyethylene, on the lower end of which a bead 100 is formed which removably engages recess 96. The dispenser 98 is roughly L-shaped in longitudinal cross section, as best shown in FIG. 5, in which a relatively small opening 102 is formed through which liquid in container 88 can be dispensed when the opening 102 is held adjacent the eye 36 and when the container is in a generally inverted position.

A channel-shaped member 104 extends vertically along one side of container 88, and is preferably formed as an integral part of the container. Member 104 and sidewall 90 cooperatively define a vertically extending space 106 in which a rigid strip 108 is slidably disposed. The upper end of strip 108 supports an eyelid-engaging member 110 that is of the same general structure as member 30, and is used in the same manner.

A light helical spring 114 is disposed in space 106, with the upper end of this spring being connected to a small loop 116 that extends outwardly from strip 108. The lower end of spring 114 is connected by conventional means 118 to the channel-shaped member 104.

A second opening 120 is formed in tubular liquid dispenser 98 in which a closure 122 is slidably mounted, and which under normal conditions, rests on the upper extremity of the neck 94. By means of a first pin 124 the closure 122 is connected to a link 126, which link is in turn pivotally connected to the rigid strip 108 by a second pin 128.

The spring 114 serves to maintain the strip 108, eyelid engaging member 110 and closure 122 in the positions shown in FIGS. 5 and 6. However, when the form E of the invention is inverted, with the opening 102 in close proximity to the eye 36 and the member 110 eyelid 37, the closure 122 assumes an open position when pressure is exerted on the rigid strip 108 to move it further into the confines of space 106.

A sealing member 130 extends upwardly from closure 122 (FIG. 4) that obstructs the second opening 120 to prevent inadvertent discharge of liquid from the container 88 therethrough when the device is in an inverted position. When pressure is removed from the member 110, the helical spring 114 contacts and moves the strip 108 and closure 122 into the positions shown in FIGS. 4 and 5 where the interior of the container 88 is sealed from contact with the ambient atmosphere.

Operation of the three forms of the invention have previously been described in detail, and further description thereof is not required.

I claim:

1. In combination with a bottle having a top, a flat bottom and a cylindrical sidewall in which bottle an eyewash solution is marketed, a device for holding an eyelid in an open position when said bottle is held in an inverted position to dispense said eyewash therefrom onto an eyeball through an apertured neck that forms a part of said bottle, said device including:

a. an elongate rigid strip;
b. a plurality of longitudinally spaced, transversely positioned arcuate claws that extend outwardly from said strip and slidably, frictionally and removably support the latter from said sidewall; and
c. an arcuate eyelid-engaging member supported transversely on the end of said strip most adjacent said neck, with said member when in contact with said eyelid holding the latter open as said eyewash is dispersed onto said eyeball, with the distance of said neck from said eyeball during the dispersing operation being selectively controlled by moving said strip, claws and eyelid engaging member longitudinally relative to said bottle.

2. The combination as defined in claim 1 in which said neck has threads formed on the exterior surface thereof, and said combination in addition includes:

d. an internally threaded cap that removably engages said threads on said neck to seal the eyewash in said container from contact with the ambient atmosphere when said eyewash is not being dispensed therefrom.